(12) United States Patent
Wolff et al.

(10) Patent No.: US 7,043,634 B2
(45) Date of Patent: May 9, 2006

(54) DETECTING MALICIOUS ALTERATION OF STORED COMPUTER FILES

(75) Inventors: Daniel Joseph Wolff, Aylesbury (GB); Mark Harris, Banbury (GB); Michael Kenneth Glover, Bournemouth (GB)

(73) Assignee: McAfee, Inc., Santa Clara, CA (US)

( * ) Notice: Subject to any disclaimer, the term of this patent is extended or adjusted under 35 U.S.C. 154(b) by 837 days.

(21) Appl. No.: 09/854,493

(22) Filed: May 15, 2001

(65) Prior Publication Data
US 2002/0174349 A1 Nov. 21, 2002

(51) Int. Cl.
*H04L 9/00* (2006.01)
(52) U.S. Cl. .......................... 713/165; 705/51
(58) Field of Classification Search .................. 705/51, 705/57; 714/15, 819; 713/165
See application file for complete search history.

(56) References Cited

U.S. PATENT DOCUMENTS

| | | | | |
|---|---|---|---|---|
| 5,050,212 A | * | 9/1991 | Dyson | 713/187 |
| 5,287,504 A | * | 2/1994 | Carpenter et al. | 707/201 |
| 5,349,655 A | * | 9/1994 | Mann | 714/6 |
| 5,473,815 A | | 12/1995 | Sonden et al. | 29/890.149 |
| 5,502,815 A | | 3/1996 | Cozza | 714/38 |
| 5,649,095 A | | 7/1997 | Cozza | 714/39 |

OTHER PUBLICATIONS

Jamsa, "DOS: The Complete Reference" 3rd Edition, pp. 392-401, 406-407, xxiii.*

* cited by examiner

*Primary Examiner*—Emmanuel L. Moise
*Assistant Examiner*—Thomas Ho
(74) *Attorney, Agent, or Firm*—Zilka-Kotab, PC; Christopher J. Hamaty (57) ABSTRACT

When a file is created on a computer, an archive copy of that file is also created and separately stored. Upon a subsequent access to the active copy of that file, a comparison between the active copy and the full archived copy is made to detect any changes. If there are not any changes, then the active copy of the file is assumed to be clean from malicious alteration and the access request is permitted. If an alteration has been made and is detected, then further countermeasures are triggered, such as full virus scanning of that file or blocking of its use. This archiving and comparison technique may be selectively applied to a subset of file types, such as executable files and dynamic link libraries, which are known to be infrequently modified during normal user operations.

12 Claims, 5 Drawing Sheets

DETECTING MALICIOUS ALTERATION OF STORED COMPUTER FILES

BACKGROUND OF THE INVENTION

1. Field of the Invention

This invention relates to the field of data processing systems. More particularly, this invention relates to the detection of the malicious alteration of stored computer files, such as, for example, by computer viruses infecting stored computer files.

2. Description of the Prior Art

It is known to provide anti-virus computer systems that seek to detect if stored computer programs have been subject to computer virus infection whereby the computer file is altered by the computer virus. These anti-virus computer systems typically operate by having a stored library of virus characteristics and then searching the computer files to detect those characteristics. As the number of known computer viruses increases, then the amount of processing needed to search a computer file for any characteristics of all those known computer viruses also increases. Furthermore, the typical number of computer files held within a computer system is also rapidly increasing. This combination of factors produces a problem that the processing load and processing time required to perform comprehensive anti-virus scanning is becoming disadvantageously large. As an example, a fall on-demand scan of every file held on a network storage device may take so long to run that insufficient time is available during the normal out-of-hours periods available to complete such an on-demand scan.

U.S. Pat. No. 5,619,095, U.S. Pat. No. 5,502,815 and U.S. Pat. No. 5,473,815 describe systems that seek to detect alterations in computer files by generating data characteristics of the computer file when first created and then comparing this with similar data generated upon an access attempt to that file to see if that file has been altered.

SUMMARY OF THE INVENTION

Viewed from one aspect the present invention provides a computer program product comprising a computer program operable to control a computer to detect a malicious alteration to a stored computer file, said computer program comprising:

file comparing logic operable to compare said stored computer file with an archive copy of said computer file stored when said stored computer file was created; and comparison response logic operable if said file comparing logic detects that said stored computer file and said archive computer file do not match to trigger further countermeasures against a potential malicious alteration.

The invention recognises that with the rapid increase in capacity and lowering cost of data storage capacity within computer systems, it is practical to store a relatively comprehensive archive set of the computer files that are created when the active stored computer files were created. Furthermore, the invention recognises that in many cases there is no normal reason why these computer files would be altered after they had been created. As an example, if an archive set of executable files and dynamic link library files is kept, then the average computer user would not normally make any alterations to this type of file since their active data is stored in documents, spreadsheets, databases and other file types. Accordingly, this archive of essentially static files may be used to compare the active stored files with these archived files to see if there has been any changes in the stored active files. This direct comparison is in fact quicker than seeking to detect many tens of thousands of different computer viruses that may be present within that file. Thus, providing the file was uninfected when it was first stored, then, if it is unaltered, it will still be uninfected and can be rapidly passed as clean during normal use. If a stored computer file has been altered from the archive copy of that computer file, then further countermeasures may be triggered.

As one example of such counter measures, altered computer files may then be referred on to an anti-virus scanning system which then scans in detail within those altered files to detect the characteristics of any known computer viruses.

The archive copy of the computer files may be stored in a variety of ways, such as in a simple unencrypted form. However, preferred embodiments seek to increase security by storing the archive copy of the computer files in an encrypted form or on a PGP disk or similar encrypted system.

The archive copy of the computer files may for security be stored on a separate physical device. Alternatively, in some cases simplicity and speed may be improved when the archive copies are simply stored in a different part of the same physical device, such as on a separate network volume defined upon that physical device. Both the original and the archive copies could be stored on network shares.

As previously mentioned, the technique is particularly well suited to the detection of malicious alteration to file types that are normally static and remain unaltered. Examples of such file types are executable file types (such as EXE and COM files) and dynamic link library file types.

The system can be made substantially automatic as far as the user is concerned if an automated mechanism is provided to create the archive file copies when the original active stored computer files are created or copied onto the device. This automatic archive copy generator may also be selective in the file types which it targets.

Complementary aspects of the invention also provide a method of operating a computer and a computer apparatus in accordance with the above described techniques.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
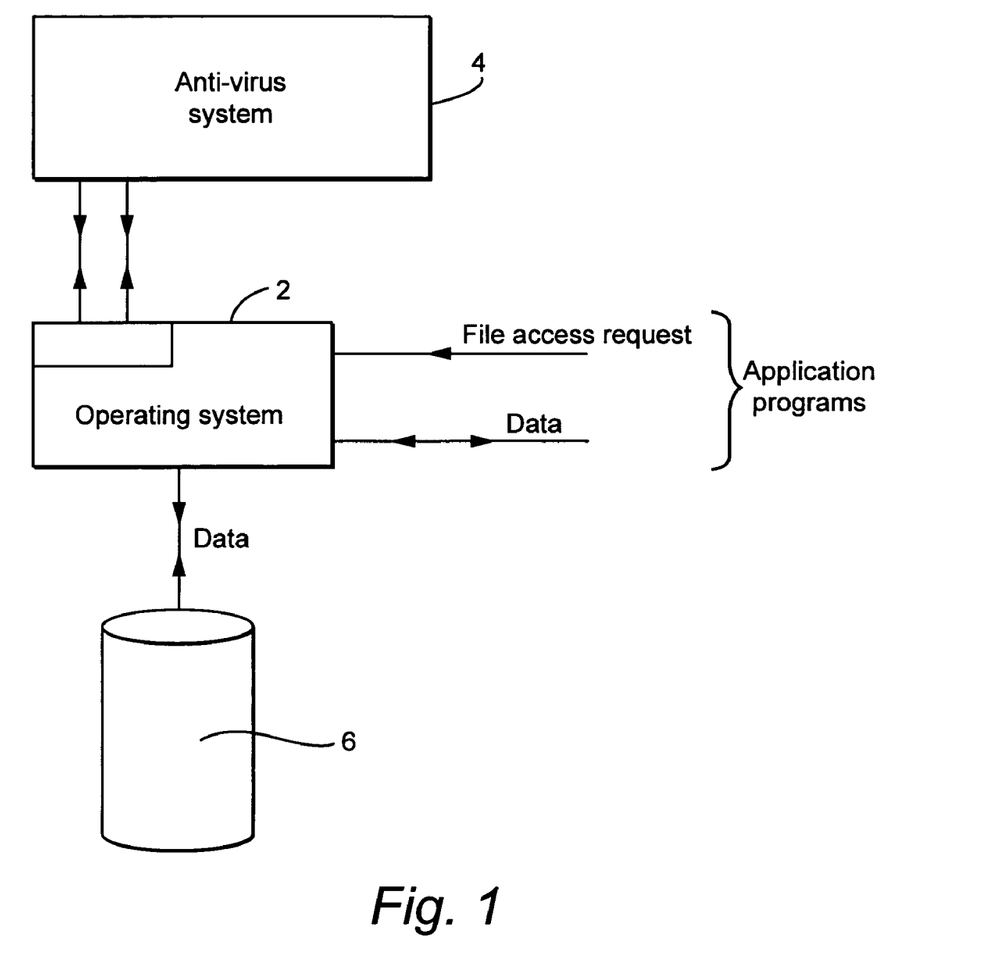
FIG. 1 schematically illustrates a portion of a computer system showing the relationship of the anti-virus systems to normal file access operations.

FIG. 1 schematically illustrates the relationship between an operating system 2, an anti-virus system 4 and a data storage device 6. In normal operation file access requests from application programs are passed to the operating system 2, which then controls the servicing of those file access requests by the data storage device 6. When an anti-virus system 4 is present, then this serves to intercept the normal file access requests and pass their details together with the file concerned to the anti-virus system 4. The anti-virus system 4 can then conduct anti-virus countermeasures, such as scanning for viruses, worms, Trojans, malware and the like. If the anti-virus system 4 detects that the file being accessed is clean, then this is indicated back to the operating system 2 and the operating system 2 then services the file access request for the application program in the normal way. Conversely, if the anti-virus system 4 detects a computer virus or other malicious content (such as a Trojan or a worm), then countermeasures are triggered, such as quarantining, cleaning or deletion.

Figure 2:
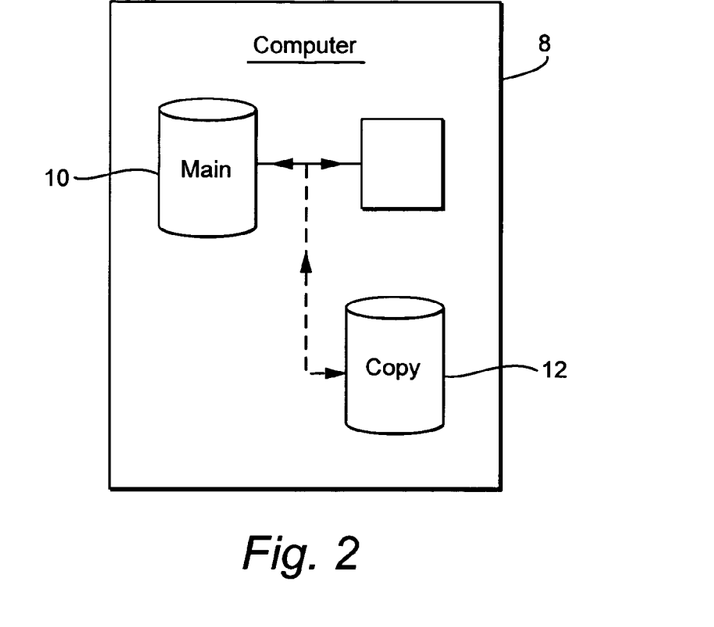
FIGS. 2 and 3 schematically illustrate possible storage locations for archive copies of computer files.

FIG. 2 schematically illustrates a computer 8 containing a first data storage device 10 and a second data storage device 12. High capacity, high speed data storage devices are becoming less expensive and accordingly the provision of a comparatively large storage capacity within a computer 8 is quite practical. In operation, the active copies of computer files are stored upon the first data storage device 10. Archive copies of all executable and DLL files are stored to the second data storage device 12 as they created for the first time upon the first data storage device 10. These archive copies may then be compared with the main active copies upon access to those active copies at a later time to detect if there has been any alteration in those active copies. If there has been an alteration, then further countermeasures may be triggered, such as thorough anti-virus scanning.

FIG. 2 illustrates the second data storage device 12 as being incorporated within the same computer 8. This may be convenient for high speed access. However, it will be appreciated that the second data storage device 12 could be physically located within a different computer, such as on a different computer on the same computer network, providing the computer 8 does have access to that second data storage device 12 to retrieve the archived filed copies when needed.

Figure 3:
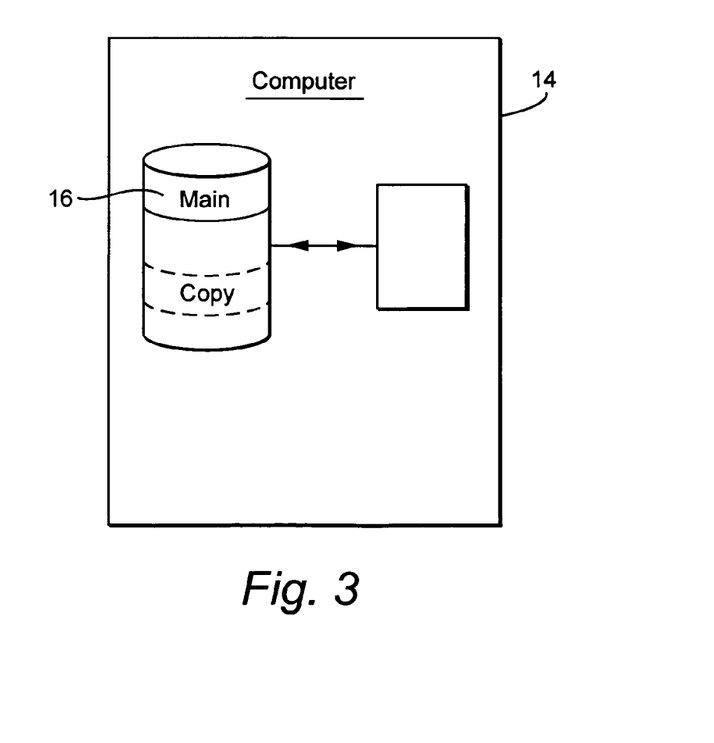

FIG. 3 illustrates another embodiment. In this embodiment the computer 14 includes a single data storage device 14. In this case the active copies of the computer files and the archived copies of the computer files are stored on the same data storage device, but in different portions of that device, such as in different logical volumes defined on the device.

The archived copies of the computer files could be stored in an unencrypted plain form directly corresponding to the active copies of the files. However, in order to improve security, the archive copies may be encrypted for storage and require decryption to their original state prior to comparison with the active copies. The archive copies could alternatively be stored upon a PGP or other secure data storage drive or device. Other known encryption techniques may be employed.

Figure 4:
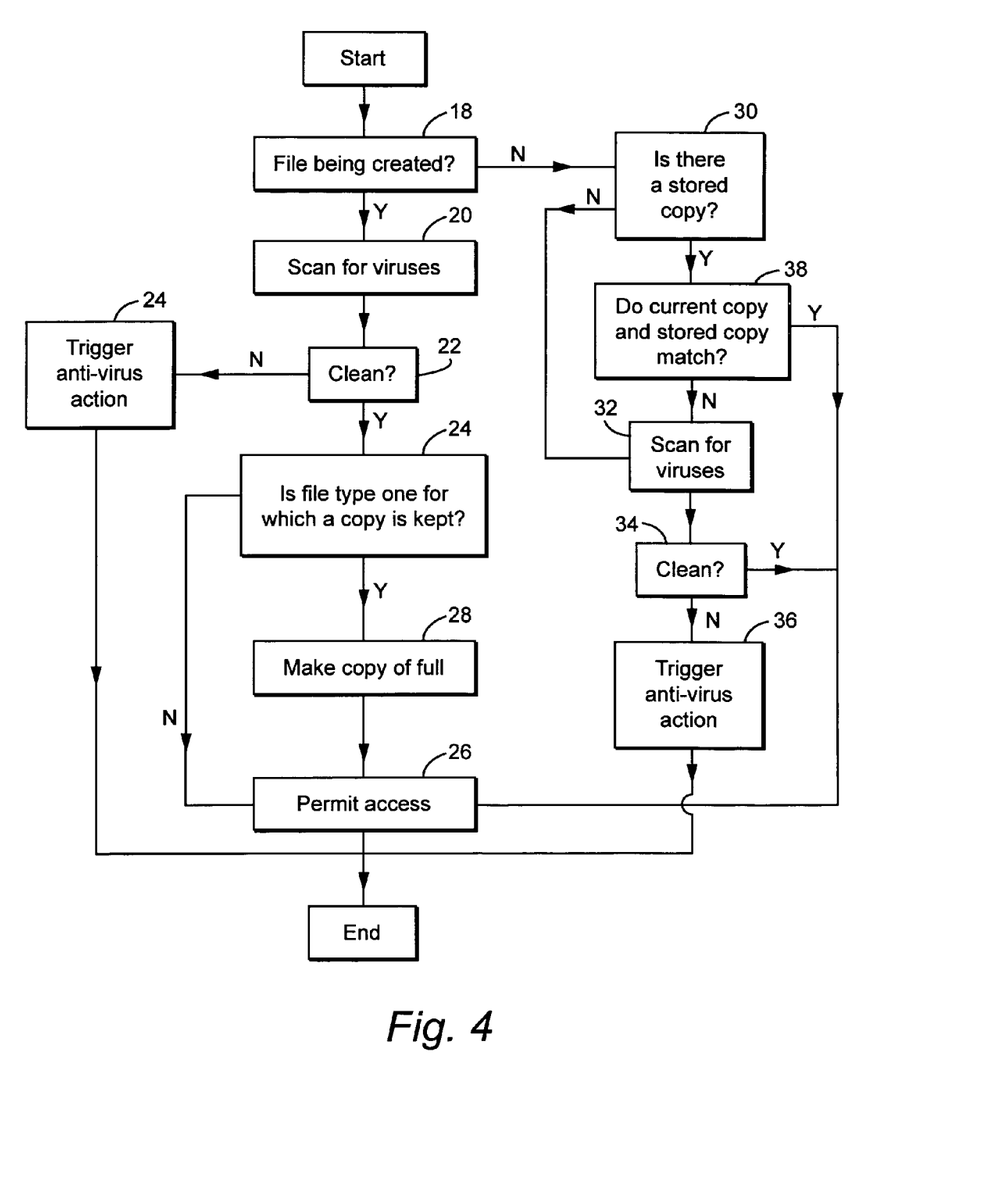
FIG. 4 is a flow diagram illustrating processing in accordance with a first embodiment.

FIG. 4 illustrates a first embodiment. At step 18, when a file access request has been made, a check is performed to determine if a file is being created for the first time. If a file is being created for the first time, then that file is scanned for viruses at step 20. Step 22 determines whether or not the results of the virus scan indicated that the file being created was free of computer viruses (or other malicious content or unwanted content). If the file being created did contain any computer viruses, then processing proceeds to step 24 at which anti-virus (or other) countermeasures, such as user or administrator alerts, quarantining, deletion, cleaning etc. are triggered. If the file being created is free of computer viruses, then step 24 determines whether or not the file type of the file being created is one for which archive copies are kept. In a preferred embodiment, archive copies are kept for executable and DLL file types which are unlikely to be altered by a user during normal operation. If archive copies are not being kept, then processing proceeds to step 26 at which the access requested, in this case file creation, is permitted. If archive copies are being made for this file type, then these are created at step 28 before processing proceeds to step 26.

If the test at step 18 indicated that the access request was not one for file creation, then processing proceeds to step 30 at which a check is made to see if there is a stored archive copy of the file to which the access request is being made. If there is no stored copy, then processing proceeds to step 32, at which standard scanning for computer viruses in accordance with the normal library of virus definition data takes place. If this virus scanning indicates that the file is free from viruses at step 34, then processing proceeds to step 26 to permit the access. If the scanning indicates the presence of a virus, then anti-virus measures at step 36 are triggered.

If the test at step 30 indicates that an archived copy of the file to which the access request is being made is stored, then step 38 performs a byte-by-byte or other form of comparison of full copies of the currently active computer file and the archived computer file to check that they fully match. If the two copies do fully match, then no alterations have been made to that computer file since it was created and accordingly since the computer file was scanned for viruses when it was created, then the computer file can be treated as clean. If the comparison at step 38 does not reveal a match, then processing proceeds to step 32 where a normal scan for viruses is triggered.

It will be appreciated that periodically full on-demand virus scans of all the computer files stored, irrespective of whether there are any archive copies may be beneficial in order to provide protection against computer viruses that may have been infecting those files at the time when they were first created on the system, but were not yet known to the anti-virus systems, and accordingly were first categorised as clean and archived even though they were in fact infected. Nevertheless, for normal day-to-day operation the test conducted at steps 38 to compare the active copy of the file with the archive copy of the file and treat the file as clean if these match, provides a significant reduction in the amount of processing required and accordingly is advantageous.

It will be appreciated that step 28 could apply user defined rules to determine whether or not an archive copy is made. For example, a user could be prompted to confirm that they wish to make an archive copy. Archive copies could always be made. Archive copies could be made when the origin of the files matched a predetermined list of file types or other combinations of factors.

Step 38 in FIG. 4 is illustrated as passing a non-matching current copy through to step 32 for scanning for viruses. As an alternative, files which do not match could simply be blocked from use, or processing passed to the anti-virus actions at step 36 without requiring the scanning of step 32.

The processing illustrated in FIG. 4 is performed when a file is accessed. It may be that when embodied within an on-access scanner, this processing is carried out upon the first access to that file since activation of the scanner. Such scanners can keep a record of previously accessed and passed-as-clean files such that they avoid re-scanning them or checking them in other ways upon subsequent accesses when they know that they have not in the intervening period been modified. This type of mechanism to reduce the processing load may be combined with the techniques described herein.

The match comparison conducted at step 38 could take a variety of forms. A byte-by-byte comparison or binary comparison could be performed in some embodiments. Alternatively, each full copy of the file could be subject to processing, such as generation of an MD5 checksum or similar, and then these results compared to verify a match between the files concerned.

Figure 5:
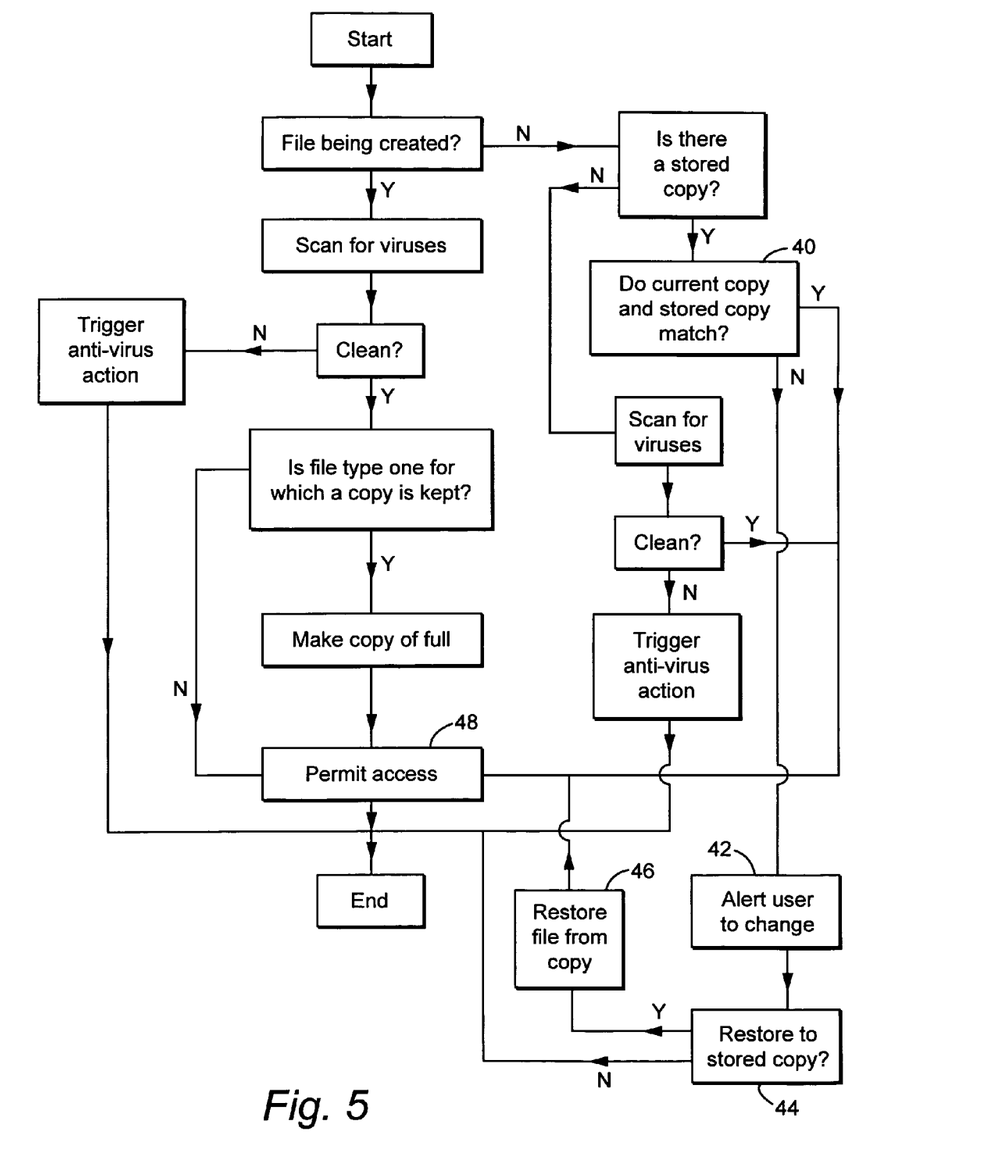
FIG. 5 is a flow diagram illustrating processing in accordance with a second embodiment.

FIG. 5 illustrates processing in accordance with a second embodiment. The generation of archive copies in the first place proceeds in the same manner as for FIG. 4. The difference between the processing of FIG. 5 and that of FIG. 4 starts at the comparison step between the archive copy and the currently active copy that is performed at step 40. In this embodiment if the two copies do not match, then processing proceeds to step 42 at which the user is notified of the occurrence of the non-match. The user may define a set of rules for how processing proceeds further from this point. One possibility would be for the user to waive their right to notification and automatically restore the altered file from the archived copy at step 44. Another option may be to prompt the user for confirmation of the restore operation or to selectively restore based upon the origin of the file, the file types or some other rule.

If processing proceeds to step 44 and the user confirms the restore operation, then the currently active non-matching copy is replaced by the archived copy at step 46 and then processing proceeds to permit access at step 48. This provides file repair.

This repair technique synergistically combines with the pure alteration detection technique of FIG. 4.

Figure 6:
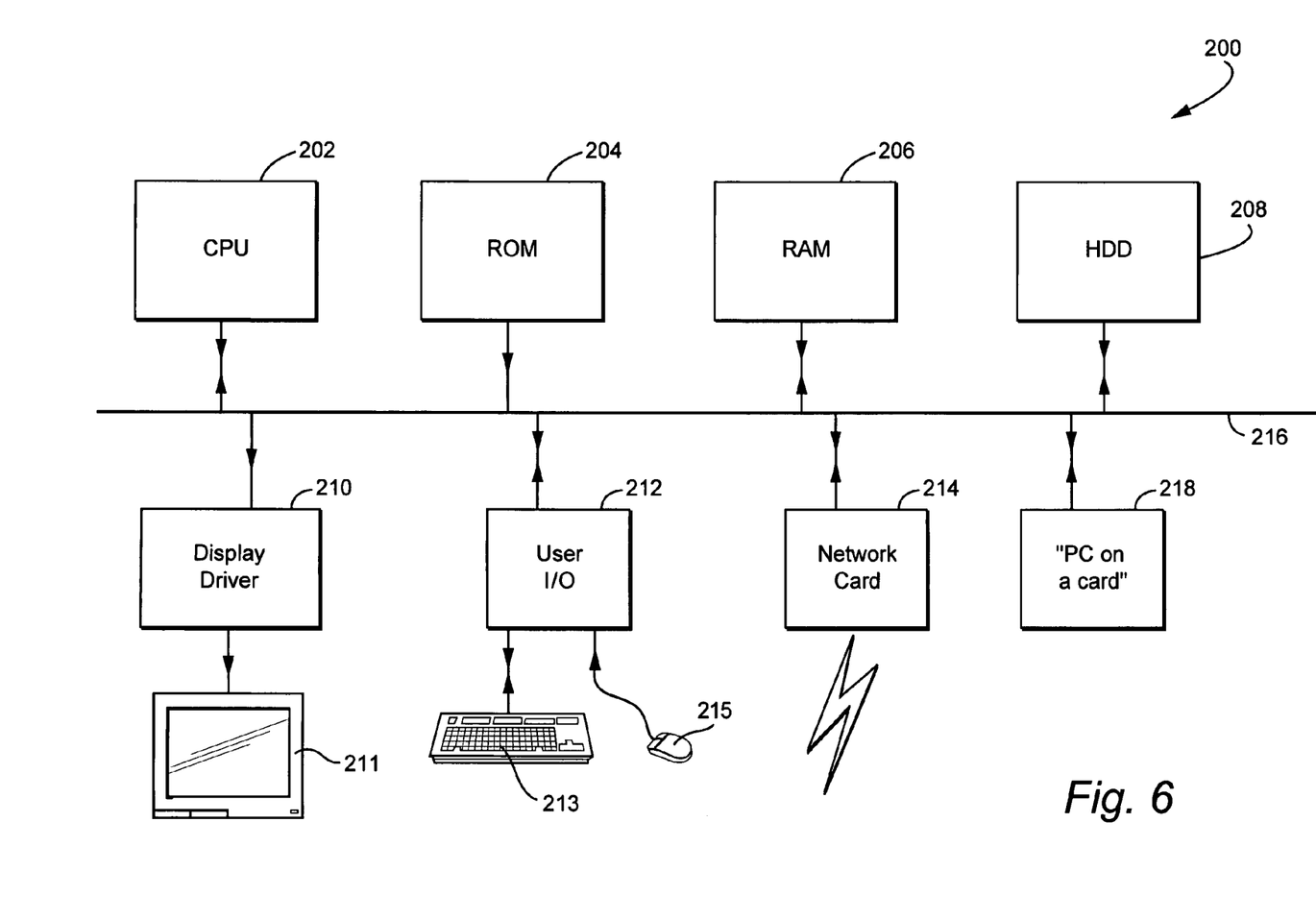
FIG. 6 is a diagram schematically illustrating a general purpose computer of the type that may be used to implement the present techniques.

FIG. 6 illustrates a general purpose computer 200 of the type that may be used to perform the above described techniques. The general purpose computer 200 includes a central processing unit 202, a read only memory 204, a random access memory 206, a hard disk drive 208, a display driver 210 with attached display 211, a user input/output circuit 212 with attached keyboard 213 and mouse 215, a network card 214 connected to a network connection and a PC computer on a card 218 all connected to a common system bus 216. In operation, the central processing unit 202 executes a computer program that may be stored within the read only memory 204, the random access memory 206, the hard disk drive 208 or downloaded over the network card 214. Results of this processing may be displayed on the display 211 via the display driver 210. User inputs for triggering and controlling the processing are received via the user input/output circuit 212 from the keyboard 213 and mouse 215. The central processing unit 202 may use the random access 206 as its working memory. A computer program may be loaded into the computer 200 via a recording medium such as a floppy disk drive or compact disk. Alternatively, the computer program may be loaded in via the network card 214 from a remote storage drive. The PC on a card 218 may comprise its own essentially independent computer with its own working memory, CPU and other control circuitry that can co-operate with the other elements in FIG. 4 via the system bus 216. The system bus 216 is a comparatively high bandwidth connection allowing rapid and efficient communication.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A computer program product comprising a computer program operable to control a computer to detect a malicious alteration to a stored computer file, said computer program comprising:

file comparing logic operable to directly compare the entire contents of said stored computer file with the entire contents of an archive copy of said computer file as stored when said stored computer file was created; and comparison response logic operable if said file comparing logic detects that the entire contents of said stored computer file and the entire contents of said archive computer file do not match to trigger further countermeasures against a potential malicious alteration;

wherein a subset of file types stored by said computer are subject to comparison by said file comparing logic and to creation of an archive copy for use with said file comparing logic;

wherein, upon creation of said stored computer file, said archive copy of said computer file is also created;

wherein said archive copy of said computer file is created for a subset of file types stored by said computer;

wherein said subset of file types includes one or more of:
executable file types; and
dynamic link library file types.

2. A computer program product as claimed in claim 1, wherein said further countermeasures include scanning said stored computer file using a library of computer virus definition data to identify a computer virus infection of said stored computer file.

3. A computer program product as claimed in claim 1, wherein said archive copy of said computer file is stored in one of:
an unencrypted form;
an encrypted form;
an encrypted media;
an encrypted volume; and
a PGP disk.

4. A computer program product as claimed in claim 1, wherein said archive copy of said computer file is stored in one of:
a different physical storage device to said stored computer file; and
a different part of a common physical storage device shared with stored computer file.

5. A method of detecting a malicious alteration to a stored computer file, said method comprising the steps of:

directly comparing the entire contents of said stored computer file with the entire contents of an archive copy of said computer file as stored when said stored computer file was created; and if said file comparing step detects that the entire contents of said stored computer file and the entire contents of said archive computer file do not match, triggering further countermeasures against a potential malicious alteration;

wherein a subset of file types stored by said computer are subject to comparison by file comparing logic and to creation of an archive copy for use with said file comparing logic;

wherein, upon creation of said stored computer file, said archive copy of said computer file is also created;

wherein said archive copy of said computer file is created for a subset of file types stored by said computer;

wherein said subset of file types includes one or more of:
   executable file types; and
   dynamic link library file types.

6. A method as claimed in claim 5, wherein said further countermeasures include scanning said stored computer file using a library of computer virus definition data to identify a computer virus infection of said stored computer file.

7. A method as claimed in claim 5, wherein said archive copy of said computer file is stored in one of:
   an unencrypted form;
   an encrypted form;
   an encrypted media;
   an encrypted volume; and
   a PGP disk.

8. A method as claimed in claim 5, wherein said archive copy of said computer file is stored in one of:
   a different physical storage device to said stored computer file; and
   a different part of a common physical storage device shared wit stored computer file.

9. Apparatus for processing data operable to detect a malicious alteration to a stored computer file, said apparatus comprising:
   a file comparator operable to directly compare the entire contents of said stored computer file wit the entire contents of an archive copy of said computer file stored when said as stored computer file was created; and
   a comparison responder operable if said file comparator detects that the entire contents of said stored computer file and the entire contents of said archive computer file do not match to trigger further countermeasures against a potential malicious alteration;

wherein a subset of file types stored by said computer are subject to comparison by said file comparator and to creation of an archive copy for use with said file comparator;

wherein, upon creation of said stored computer file, said archive copy of said computer file is also created;

wherein said archive copy of said computer file is created for a subset of file types stored by said computer;

wherein said subset of file types includes one or more of:
   executable file types; and
   dynamic link library file types.

10. Apparatus as claimed in claim 9, wherein said further countermeasures include scanning said stored computer file using a library of computer virus definition data to identify a computer virus infection of said stored computer file.

11. Apparatus as claimed in claim 9, wherein said archive copy of said computer file is stored in one of:
   an unencrypted form;
   an encrypted form;
   an encrypted media;
   an encrypted volume; and
   a PGP disk.

12. Apparatus as claimed in claim 9, wherein said archive copy of said computer file is stored in one of:
   a different physical storage device to said stored computer file; and
   a different part of a common physical storage device shared with stored computer file.

* * * * *

UNITED STATES PATENT AND TRADEMARK OFFICE
CERTIFICATE OF CORRECTION

PATENT NO. : 7,043,634 B2  Page 1 of 1
APPLICATION NO. : 09/854493
DATED : May 9, 2006
INVENTOR(S) : Wolff et al.

It is certified that error appears in the above-identified patent and that said Letters Patent is hereby corrected as shown below:

col. 7, line 20 replace "wit" with --with--;
    col. 7, line 25 replace "wit" with --with--.

Signed and Sealed this

Second Day of February, 2010

David J. Kappos
*Director of the United States Patent and Trademark Office*